(12) United States Patent
Wada et al.

(10) Patent No.: US 8,820,813 B2
(45) Date of Patent: Sep. 2, 2014

(54) STRUCTURAL MEMBER

(75) Inventors: Manabu Wada, Tokyo (JP); Masaaki Mizumura, Tokyo (JP); Koichi Sato, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/703,735
(22) PCT Filed: Jun. 17, 2011
(86) PCT No.: PCT/JP2011/063874
§ 371 (c)(1),
(2), (4) Date: Dec. 12, 2012
(87) PCT Pub. No.: WO2011/158923
PCT Pub. Date: Dec. 22, 2011

(65) Prior Publication Data
US 2013/0088033 A1 Apr. 11, 2013

(30) Foreign Application Priority Data

Jun. 17, 2010 (JP) ................................ 2010-138567
May 12, 2011 (JP) ................................ 2011-107518

(51) Int. Cl.
| | | |
|---|---|---|
| B62D 27/02 | (2006.01) | |
| B62D 25/04 | (2006.01) | |
| B62D 25/20 | (2006.01) | |
| B62D 33/04 | (2006.01) | |
| B21D 26/037 | (2011.01) | |
| B62D 23/00 | (2006.01) | |
| B21D 53/88 | (2006.01) | |
| B62D 21/08 | (2006.01) | |
| B62D 21/00 | (2006.01) | |

(52) U.S. Cl.
CPC ............. B62D 27/023 (2013.01); B62D 25/04 (2013.01); B62D 25/2036 (2013.01); B62D 33/044 (2013.01); B21D 26/037 (2013.01); B62D 23/005 (2013.01); B21D 53/88 (2013.01); B62D 21/08 (2013.01); B62D 21/00 (2013.01)
USPC ........ 296/29; 296/203.01; 296/205; 29/897.2

(58) Field of Classification Search
USPC .................... 296/29, 187.08, 187.09, 187.12, 296/193.05, 193.06, 193.07, 203.01, 296/203.03, 204, 205, 209; 29/897, 897.2
See application file for complete search history.

(56) References Cited

U.S. PATENT DOCUMENTS 2,149,844 A * 3/1939 George ........................ 403/178
4,051,704 A * 10/1977 Kimura ............................ 72/58

(Continued)

FOREIGN PATENT DOCUMENTS

| JP | 58-167033 | 10/1983 |
|---|---|---|
| JP | 61-172460 | 10/1986 |

(Continued)

OTHER PUBLICATIONS

"Tube Forming-Secondary Formation and Product Design of a Tube Member", The Japan Society for Technology of Plasticity, Corona Publishing (1992), and a partial English translation thereof.

(Continued)

Primary Examiner — Glenn Dayoan
Assistant Examiner — Jason S Daniels
(74) Attorney, Agent, or Firm — Kenyon & Kenyon LLP

(57) ABSTRACT

A structural hydroformed joint member has projecting portions (30a, 30b) formed integrally on an outer peripheral face of a hollow main tube part (20) by hydroforming an element tube with an outside diameter D. In this case, both intersecting planes (35a, 35b), which are projecting planes of end faces (33a, 33b) of the projecting portions (30a, 30b) toward the main tube part (20), share a plane perpendicular to the main axis (40) of the main tube part (20) only in portions (36a, 36b) of the intersecting planes (35a, 35b). At that time, by setting areas of the portions (36a, 36b) to 30% or more and 90% or less relative to an area of each of the intersecting planes (35a, 35b), a projecting height of each of the projecting portions (30a, 30b) is 0.3 D or higher for functioning as a joint.

10 Claims, 22 Drawing Sheets

(56) References Cited

U.S. PATENT DOCUMENTS

| | | | |
|---|---|---|---|
| 5,333,775 A * | 8/1994 | Bruggemann et al. | 228/157 |
| 5,794,398 A * | 8/1998 | Kaehler et al. | 52/653.2 |
| 5,829,219 A * | 11/1998 | Sugawara et al. | 52/653.2 |
| 6,148,581 A * | 11/2000 | Separautzki | 52/653.2 |
| 6,241,310 B1 * | 6/2001 | Patelczyk | 296/205 |
| 6,539,604 B2 * | 4/2003 | Patelczyk | 29/421.1 |
| 7,386,938 B2 * | 6/2008 | Bruggemann et al. | 29/897.2 |
| 7,695,824 B2 * | 4/2010 | Gejima et al. | 428/586 |
| 2010/0186473 A1 | 7/2010 | Mizumura et al. | |

FOREIGN PATENT DOCUMENTS

| | | |
|---|---|---|
| JP | 61-273221 | 12/1986 |
| JP | 02-147127 | 6/1990 |
| JP | 5-84420 | 11/1993 |
| JP | 07-088538 | 4/1995 |
| JP | 11-170060 | 6/1999 |
| JP | 2001-340922 | 12/2001 |
| JP | 2003-200234 | 7/2003 |
| JP | 2005-319486 | 11/2005 |
| JP | 2007-331012 | 12/2007 |
| JP | 2009-174006 | 8/2009 |
| WO | 2009/014233 | 1/2009 |

OTHER PUBLICATIONS

Japanese Office Action dated Mar. 5, 2013, issued in corresponding Japanese Application No. 2012-506260, and an English summary thereof.

International Preliminary Report on Patentability dated Jan. 24, 2013 issued in corresponding PCT Application No. PCT/JP2011/063874.

International Search Report dated Oct. 11, 2011, issued in corresponding PCT Application No. PCT/JP2011/063874.

Office Action dated Sep. 24, 2013 issued in corresponding Japanese Application No. 2012-173950 [With English Summary of Office Action].

* cited by examiner

STRUCTURAL MEMBER

This application is a national stage application of International Application No. PCT/JP2011/063874, filed Jun. 17, 2011, which claims priority to Japanese Application Nos. 2010-138567, filed Jun. 17, 2010, and 2011-107518, filed May 12, 2011, the contents of which are incorporated by reference in their entirety.

TECHNICAL FIELD

The present invention relates to a structural member preferred for use with, for example, a structural joint member having plural projecting portions integrally formed on an outer peripheral face of a hollow main tube part.

BACKGROUND ART

Due to environmental conservation issues, weight reduction of structural member is demanded. Among structural members, structural members for transportation apparatuses, particularly for automobile, are strongly demanded to be reduced in weight because the effects of weight reduction of structural members for automobiles are large, such as fuel consumption improvement and exhaust gas and carbon dioxide emission reduction.

Weight reduction of a structural member can be achieved by enhancing the strength of material of the structural member and thinning of the structural member. Regarding destruction of the structural member accompanying thinning of the structural member, namely, plastic deformation and fatigue failure of the structural member, the insufficient strength decreased due to thinning can be compensated by material strength enhancement of the structural member. However, regarding deflection of the structural member, namely, elastic deformation of the structural member, it is not possible to compensate insufficient rigidity decreased due to thinning by material strength enhancement of the structural member.

In particular, in the case of a structural member for automobiles, even when the material of the structural member is increased in strength to obtain the same strength of the entire structural member as that before thinning, if the geometrical structure of the entire thinned structural member is the same as that before thinning, and the rigidity of the entire thinned structural member has decreased, this causes noise and/or vibrations.

Further, among structural members for automobile, if rigidity decreases due to thinning of vehicle body member, chassis member, or the like, there is also a problem that operating stability decreases.

Therefore, to improve the strength as the entire structure without decreasing the rigidity thereof, it is necessary to enhance the strength of structural members forming the entire structure, and prevent reduction of rigidity of the entire structure by changing the geometrical structure of the entire structure.

As a method for preventing decrease in rigidity of the entire structure formed of structural members even when the structural members are thinned, it is effective to improve rigidity of coupling members, and to use a joint member having a hollow structure in particular.

As a metal processing method for obtaining a structural member having a hollow structure, there are casting, welding of plate materials, hydroforming, and so on.

Casting has a difficulty in thinning as compared to other metal processing methods. Further, elements for securing fluidity are added to an alloy for casting in either case of iron-based alloy and light-weight alloy, and thus it is difficult to enhance the strength of the material itself as compared to an elongated material or an extruded material of steel plate material or light-weight alloy. On the other hand, die-casting which allows thinning has a difficulty in obtaining a structural member having a hollow shape.

Further, when plate materials are welded to produce a structural member, although freedom in shape of the structural member is high, the welding length becomes long when the structural member is produced to have a hollow shape, and thus there is a problem that it is inferior in productivity.

Accordingly, it is effective to form the entire structure, for example the automobile body or chassis, by welding a structural joint member which is hydroformed.

Patent Document 1 and Non-patent Document 1 disclose a hydroformed body having plural projecting portions on a main tube part by shaping an element tube by hydroforming.

Further, Patent Document 2 discloses a bulge-formed product of polygonal tube for joint member, employing a hollow material formed of aluminum or an alloy thereof extruded in a polygonal shape in advance as a raw material, where two expanded portions are formed in this polygonal hollow material by bulge forming.

CITATION LIST

Patent Literature

Patent Literature 1: Japanese Examined Patent Application Publication No. 58-167033
Patent Literature 2: Japanese Unexamined Utility Model Application Publication No. 5-84420

Non Patent Literature

Non Patent Literature 1: Tube Forming-Secondary Formation and Product Design of a Tube Member-, The Japan Society for Technology of Plasticity, Corona Publishing (1992)

SUMMARY OF INVENTION

Technical Problem

The hydroformed body disclosed in Patent Document 1 has two projecting portions on the main tube part. However, these two projecting portions are disposed apart from each other, and there is a problem that a structure branching from a portion in the hydroformed body being an origin cannot be formed.

The hydroformed body described in Non-patent Document 1 has two projecting portions on the main tube part, and the disposed positions of the two projecting portions are close. Thus, it has a structure branching from a portion in the hydroformed body being an origin.

However, on the, hydroformed body described in Non-patent Document 1, respective projecting heights of the two projecting portions are so short that it is not possible to couple another part to the tip of the projecting portions by welding or the like, and hence it is not possible to be used as a joint member.

The bulge-formed product described in Patent Document 2 has a structure such that the aluminum extruded material having a hollow hexagonal cross section has two expanded portions, and the two expanded portions have the same shape and are at the same positions in a longitudinal direction of the aluminum extruded material.

However, on the bulge-formed product of polygonal tube for joint member described in Patent Document 2, since the two expanded portions have the same shape and are at the same positions in the longitudinal direction of the aluminum extruded material, it is difficult to secure projecting heights of the expanded portions during bulge forming, and a desired projecting height cannot be obtained.

The present invention has been made to solve the above-described problems, and an object thereof is to provide a structural member which has plural projecting portions branching from a portion of the structural member being an origin, and is capable of securing a desired projecting height of the plural projecting portions, for example a necessary height for coupling another part by welding or the like.

Solution to Problem

The gist of the present invention is as follows.

(1) A structural member including:
a hollow main tube part; and
at least two projecting portions formed integrally on an outer peripheral face of the main tube part, in which
the two projecting portions are disposed at an angle of 30 degrees or more and less than 180 degrees around a main axis of the main tube part, and
both intersecting planes, which are projecting planes of end faces of the two projecting portions toward the main tube part, share a plane perpendicular to the main axis of the main tube part only in portions of the intersecting planes.

(2) The structural member according to (1), in which the two projecting portions are disposed at an angle of 60 degrees or more and 120 degrees or less around the main axis of the main tube part.

(3) The structural member according to (1), further including another projecting portion integrally formed on an outer peripheral face of the main tube part, in which all intersecting planes, which are projecting planes of end faces of the two projecting portions and the other projecting portion toward the main tube part, share a plane perpendicular to the main axis of the main tube part only in portions of the intersecting planes.

(4) The structural member according to (1), in which the main tube part and the two projecting portions are formed by hydroforming an element tube.

(5) The structural member according to (4), in which an outside diameter of the element tube is D, and areas of the portions of the intersecting planes are 30% or more and 90% or less relative to an area of each of the intersecting planes and a projecting height of each of the two projecting portions is 0.3 D or higher.

(6) The structural member according to (5), in which the projecting height of each of the two projecting portions is 0.8 D or lower.

(7) The structural member according to (4), in which a tensile strength of the element tube is 340 MPa or more and 850 MPa or less.

(8) The structural member according to (1), in which the main tube part is provided with a curved joining face or an oblique flat joining face which sequentially joins the two projecting portions.

(9) The structural member according to (8), in which the curved joining face or the oblique flat joining face has a gradually varying portion which becomes smaller in area toward a tube end of the main tube part.

(10) The structural member according to (9), in which the length of the gradually varying portion is 0.2 D or longer and 2.0 D or shorter in a direction parallel to the main axis of the main tube part.

(11) The structural member according to (8), in which the curved joining face or the oblique flat joining face is provided with a circumferential rib which projects inward of the main tube part.

(12) The structural member according to (8), in which the curved joining face or the oblique flat joining face is provided with a circumferential rib which projects outward of the main tube part.

(13) The structural member according to (1), in which at least one of the two projecting portions has a welding seat face protruding portion on at least a portion in a circumferential direction.

(14) The structural member according to (1), in which at least one of the two projecting portions has at least one leaf spring welding seat face portion in a circumferential direction.

(15) The structural member according to (1), in which at least one of the two projecting portions has a welding margin formed by opening at least a portion of an end face of the projecting portions.

Advantageous Effects of Invention

According to the present invention, it is possible to provide a structural member which has plural projecting portions branching from a portion of the structural member being an origin, and is capable of securing a desired projecting height of the plural projecting portions, for example a necessary height for coupling another part by welding or the like.

DESCRIPTION OF EMBODIMENTS

Hereinafter, preferred embodiments of the present invention will be described with reference to the attached drawings.

The present inventors prepared hydroformed bodies while varying thicknesses and materials of element tubes before hydroforming and positions and numbers of projecting portions, examined projecting heights of plural projecting portions formed through the hydroforming, and conducted dedicated studies on hydroformed bodies which can be used as a structural hydroformed joint member.

As a result, it was found that when partial regions in predetermined ranges of respective projecting portions share a plane perpendicular to the main axis of a main tube part, the respective projecting heights of the projecting portions become equal to or higher than a predetermined length necessary for connecting with an opponent part to be coupled.

Further, it was also found that the shape of the main tube part connecting the respective projecting portions enables to improve rigidity of the entire hydroformed body, and that the shapes of ends and end faces of the projecting portions enable to improve weldability with an opponent part to be welded to the projecting portion.

First Embodiment

Figure 1:
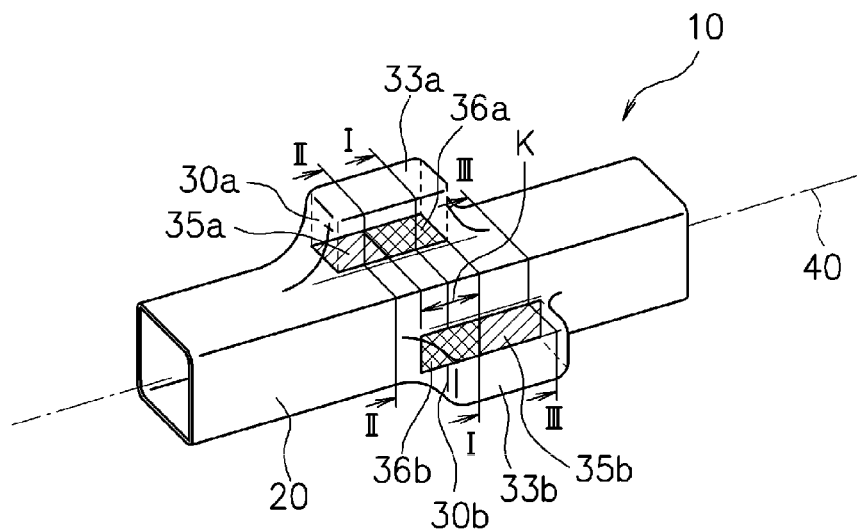
FIG. 1 is a perspective view illustrating an automobile chassis joint according to a first embodiment.

FIG. 1 is a perspective view illustrating an automobile chassis joint which is a structural hydroformed joint member according to a first embodiment applying the present invention. In FIG. 1, numeral 10 denotes the automobile chassis joint (hereinafter referred to as a "chassis joint"). The chassis joint 10 has a hollow main tube part 20 and projecting portions 30a, 30b concentrated on the main tube part 20.

The chassis joint 10 is obtained by hydroforming an element tube with a thickness of 2.3 mm, an outside diameter of 114.3 mm, and a length of 1500 mm.

The material of the element tube is a steel material with a tensile strength of 390 MPa class (total elongation: 34%). However, the material is not limited thereto. Since the chassis joint 10 has a hollow structure, decrease in its rigidity is small when it is thinned, and thus the material of the element tube is preferred to be a high-tensile steel with a tensile strength of 340 MPa or higher class and 850 MPa or lower class. When the tensile strength of the element tube is less than 340 MPa, it becomes necessary to increase the thickness of the element tube for securing the strength of the chassis joint after hydroforming, and the weight reduction ratio decreases. On the other hand, when the tensile strength of the element tube is more than 850 MPa, hydroformability decreases due to decrease in the maximum expansion ratio of the element tube.

Further, the conditions of the hydroforming may be set in an ordinary manner. For example, the chassis joint 10 was formed from a mechanical structural carbon steel tube, STKM13B, with an outside diameter of 114.3 mm and a thickness of 2.9 mm, and was formed with an axial extrusion amount of 150 mm on both left and right sides, and internal pressure of 100 MPa at a maximum. Further, if a gap exists between a projecting portion and a cavity, the gap may cause a burst, and thus a counter punch is used in each of the projecting portions. The load of the counter punch is 300 kN at a maximum.

Although not illustrated specifically, an end of the projecting portion 30a is coupled by welding to an end of B pillar of an automobile. Further, an end of the projecting portion 30b is coupled by welding to an end of cross member of an automobile.

The projecting portions 30a, 30b integrally formed on an outer peripheral face of the main tube part 20 are disposed to be shifted by 90 degrees around the main axis 40 of the main tube part 20. Note that the main axis 40 is a center line position of the element tube before forming.

Further, in a region indicated by K in FIG. 1, the projecting portions 30a, 30b overlap by positions in a longitudinal direction of the chassis joint 10, and the chassis joint 10 has a structure branching from a portion of the chassis joint 10, namely, the region indicated by K being an origin. That is, both an intersecting plane 35a of the projecting portion 30a and an intersecting plane 35b of the projecting portion 30b share a plane perpendicular to the main axis 40 only in portions. Here, the intersecting planes 35a, 35b are respective projecting planes of an end face 33a of the projecting portion 30a and an end face 33b of the projecting portion 30b toward the main tube part 20 (not including a root R portion of the main tube part 20).

Figure 2:
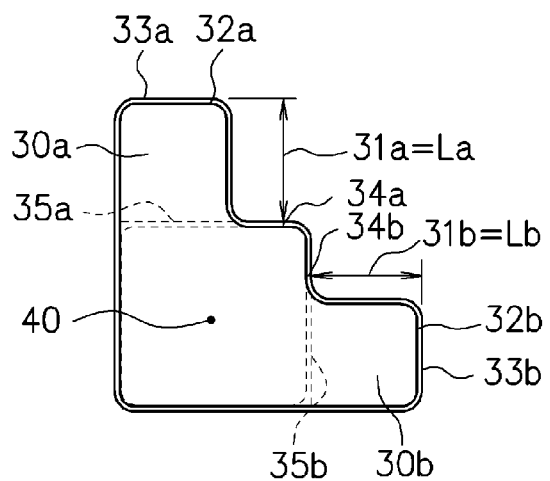
FIG. 2 is a cross-sectional view taken along line I-I of FIG. 1.

Next, the projecting heights of the projecting portions 30a, 30b will be described. FIG. 2 is a cross-sectional view taken along line I-I of FIG. 1. The projecting height of a projecting portion is the length of a line coupling a farthest point from the main axis among points on the end face of the projecting portion and the farthest point from the main axis among points on the intersecting plane between the projecting portion and the main tube part. The projecting height of the projecting portion 30a is a projecting height La illustrated in FIG. 2. A point 32a is the farthest point from the main axis 40 among points on the end face 33a of the projecting portion 30a. A point 34a is the farthest point from the main axis 40 among points on the intersecting plane 35a between the projecting portion 30a and the main tube part 20. That is, the projecting height La is the length of the shortest distance 31a between the point 32a and the point 34a. Further, the projecting height of the projecting portion 30b is a projecting height Lb illustrated in FIG. 2. A point 32b is the farthest point from the main axis 40 among points on the end face 33b of the projecting portion 30b. A point 34b is the farthest point from the main axis 40 among points on the intersecting plane 35b between the projecting portion 30b and the main tube part 20. That is, the projecting height Lb is the length of the shortest distance 31b between the point 32b and the point 34b.

The projecting heights La, Lb need to be 0.3 D or higher. Here, D represents an outside diameter of the element tube before hydroforming. This is because when the projecting heights La, Lb are lower than 0.3 D, it is not possible to couple an opponent part to the projecting portions 30a, 30b by welding or the like, and the joint does not function as a joint member as originally intended. Further, the projecting heights La, Lb are preferred to be 0.8 D or lower. When the projecting heights La, Lb are higher than 0.8 D, the plastic deformation amount of the element tube becomes large, and a crack may occur in roots of the projecting portions 30a, 30b. Note that this range of the projecting heights La, Lb is obtained by experiment.

The projecting heights La, Lb satisfy the above-described lower and upper limits when partial regions in respective predetermined ranges of the projecting portion 30a and the projecting portion 30b of the chassis joint 10 share a plane perpendicular to the main axis 40 of the main tube part 20. Here, the partial regions in the predetermined ranges are regions indicated by K in FIG. 1.

In FIG. 1, the regions indicated by K need to be in a specific numeric range defining the intersecting planes 35a, 35b which will be described later. As illustrated in FIG. 1, the projecting portion 30a intersects the main tube part 20 via the intersecting plane 35a. Further, the projecting portion 30b intersects the main tube part 20 via the intersecting plane 35b. As already described, the intersecting plane 35a is a projecting plane of the end face 33a toward the main tube part 20. In this case, the root R portion of the main tube part 20 is not included. Similarly, the intersecting plane 35b is a projecting plane of the end face 33b toward the main tube part 20. In this case, the root R portion of the main tube part 20 is not included.

The projecting heights La, Lb of the projecting portions 30a, 30b satisfy 0.3 D or higher and 0.8 D or lower when a portion 36a of the intersecting plane 35a and a portion 36b of the intersecting plane 35b of the chassis joint 10 share a plane perpendicular to the main axis 40, the area of the portion 36a of the intersecting plane 35a is in the range of 30% or more and 90% or less relative to the area of the intersecting plane 35a, and the area of the portion 36b of the intersecting plane 35b is in the range of 30% or more and 90% or less relative to the area of the intersecting plane 35b.

This point will be described taking examples of a cross section taken along I-I, a cross section taken along II-II, and a cross section taken along III-III of FIG. 1. The portion 36a of the intersecting plane 35a and the portion 36b of the intersecting plane 35b share the cross section taken along line I-I of FIG. 1. That is, both the intersecting plane 35a and the intersecting plane 35b exist in FIG. 2 illustrating the cross section taken along line I-I of FIG. 1.

Figure 3:
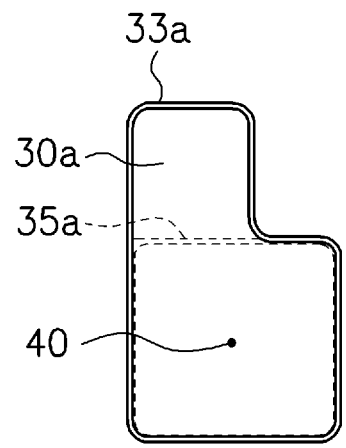
FIG. 3 is a cross-sectional view taken along line II-II of FIG. 1.

On the other hand, the cross section taken along line II-II of FIG. 1 includes the intersecting plane 35a but does not include the intersecting plane 35b. That is, in FIG. 3 illustrating the cross section taken along line II-II of FIG. 1, only the intersecting plane 35a exists and the intersecting plane 35b does not exist.

Figure 4:
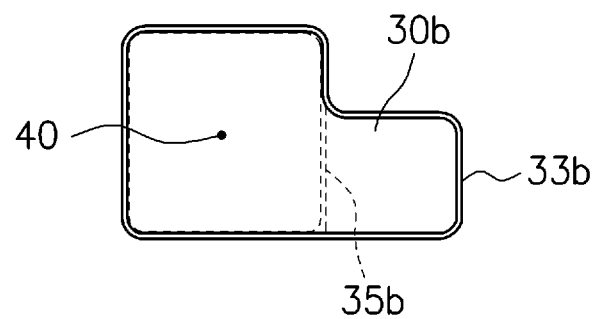
FIG. 4 is a cross-sectional view taken along line of FIG. 1.

Further, the cross section taken along line III-III of FIG. 1 includes the intersecting plane 35b but does not include the intersecting plane 35a. That is, in FIG. 4 illustrating the cross section taken along line III-III of FIG. 1, only the intersecting plane 35b exists and the intersecting plane 35a does not exist.

In short, in FIG. 1, the projecting portion 30a and the projecting portion 30b share a plane perpendicular to the main axis 40 only in the region indicated by K. Specifically, the cross section taken along line I-I is within the region indicated by K, and the cross section taken along line II-II and the cross section taken along line III-III are outside the region indicated by K. Then, the region indicated by K can be represented by the ratio of areas of the intersecting planes 35a, 35b.

Specifically, the projecting heights La, Lb of the chassis joint 10 satisfy 0.3 D or higher and 0.8 D or lower when both the intersecting planes 35a, 35b of the two projecting portions 30a, 30b share a plane (for example, the cross section taken along line I-I) perpendicular to the main axis 40 of the main tube part 20 only in the portion 36a of the intersecting plane 35a and the portion 36b of the intersecting plane 35b, the area of the portion 36a of the intersecting plane 35a is in the range of 30% or more and 90% or less of the area of the intersecting plane 35a, and the area of the portion 36b of the intersecting plane 35b is in the range of 30% or more and 90% or less of the area of the intersecting plane 35b.

In this point, in the following three cases for example, the projecting heights La, Lb of the two projecting portions 30a, 30b do not satisfy 0.3 D or higher and 0.8 D or lower. Note that in the following examples, for convenience, ones corresponding to the components of this embodiment are designated by the same numerals and described.

Figure 5:
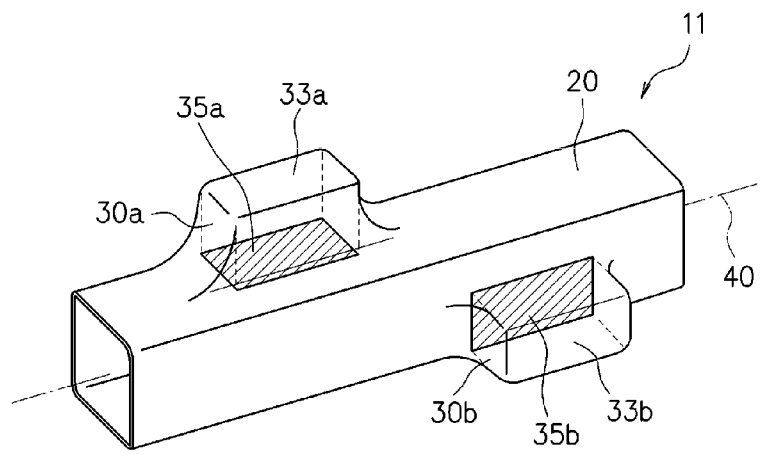
FIG. 5 is a perspective view illustrating a hydroformed body in which both of two intersecting planes do not share a plane perpendicular to a main axis of a main tube part.

The first is the case where both the intersecting plane 35a and the intersecting plane 35b do not share a plane perpendicular to the main axis 40 via the entire intersecting planes 35a, 35b. FIG. 5 is a perspective view illustrating an example of a hydroformed body of the first case. In FIG. 5, numeral 11 denotes the hydroformed body. In the hydroformed body 11 illustrated in FIG. 5, the projecting portions 30a, 30b are separated in a longitudinal direction (main axis 40 direction) of the hydroformed body 11. Thus, when the element tube is hydroformed, a plastically deformed material is supplied sufficiently to each of the projecting portions 30a, 30b, and the projecting heights La, Lb of the projecting portions 30a, 30b both exceeds 0.8 D.

Figure 6:
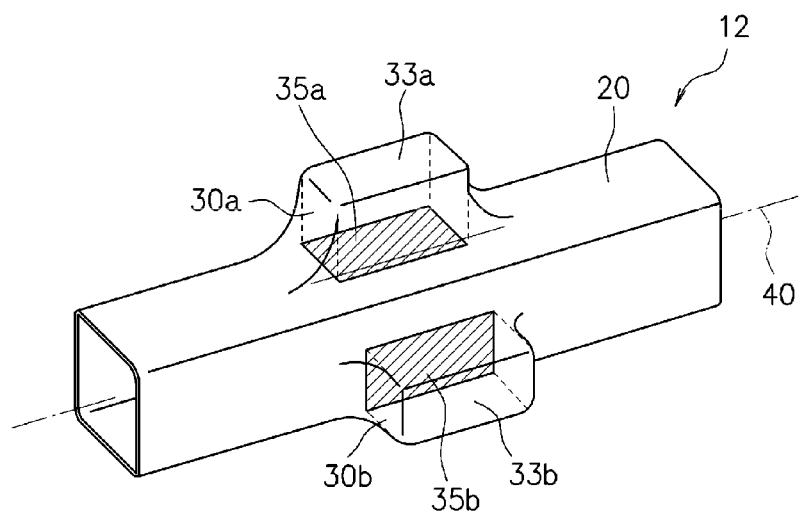
FIG. 6 is a perspective view illustrating a hydroformed body in which both of the two intersecting planes share a plane perpendicular to the main axis of the main tube part via the entire intersecting planes.

The second is the case where both the intersecting plane 35a and the intersecting plane 35b share a plane perpendicular to the main axis 40 via the entire intersecting planes 35a, 35b. FIG. 6 is a perspective view illustrating an example of a hydroformed body of the second case. In FIG. 6, numeral 12 denotes the hydroformed body. On the hydroformed body 12 illustrated in FIG. 6, the positions of the projecting portions 30a, 30b in a longitudinal direction (main axis 40 direction) of the hydroformed body 12 are the same, and the shapes of the projecting portions 30a, 30b are the same. Therefore, when the element tube is hydroformed, a large amount of plastically deformed material has to be supplied to each of the projecting portions 30a, 30b, and the projecting heights La, Lb of the projecting portions 30a, 30b both do not satisfy 0.3 D.

Figure 7:
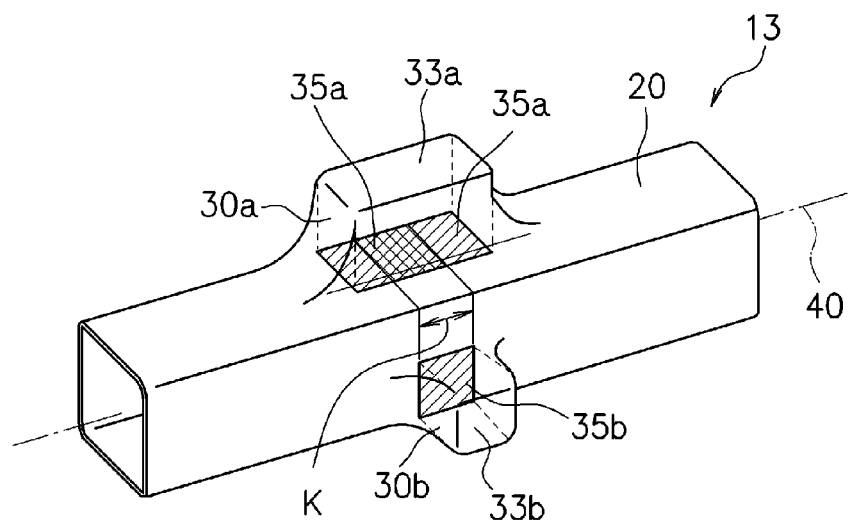
FIG. 7 is a perspective view illustrating a hydroformed body in which a portion of one of the two intersecting planes and the whole of the other intersecting plane share a plane perpendicular to the main axis of the main tube part.

The third is the case where a portion of one of the intersecting plane 35a and the intersecting plane 35b and the whole of the other intersecting plane share a plane perpendicular to the main axis 40. FIG. 7 is a perspective view illustrating an example of a hydroformed body of the third case. In FIG. 7, numeral 13 denotes the hydroformed body. In the hydroformed body 13 illustrated in FIG. 7, a portion 36a of the intersecting plane 35a of the projecting portion 30a and the whole of the intersecting plane 35b of the projecting portion 30b share a plane perpendicular to the main axis 40. That is, in the hydroformed body 13 illustrated in FIG. 7, the projecting portion 30b is disposed within a range where the projecting portion 30a is disposed with respect to a longitudinal direction (main axis 40 direction) of the hydroformed body 13. In such an arrangement, when the element tube is hydroformed, it is easy for the plastically deformed material to be supplied to a projecting portion with a large volume, and hence the plastically deformed material is supplied by priority to the projecting portion 30a with a larger volume, and the projecting height La of the projecting portion 30a exceeds 0.8 D. On the other hand, it is difficult for the plastically deformed material to be supplied to the projecting portion 30b with a small area, and the projecting height of the projecting portion 30b does not reach 0.3 D. Formation satisfying both La>0.8 D and Lb<0.3 D hardly occurs, and when the projecting height Lb of the projecting portion 30b is set to 0.3 D or higher and 0.8 D or lower, the projecting height La of the projecting portion 30a exceeds 0.8 D. When the projecting height La of the projecting portion 30a is set to 0.3 D or higher and 0.8 D or lower, the projecting height Lb of the projecting portion 30b does not reach 0.8 D.

As has been described, when the element tube is hydroformed, if the intersecting plane 35a of the projecting portion 30a and the intersecting plane 35b of the projecting portion 30b share a plane perpendicular to the main axis 40, the plastically deformed material is supplied toward the end faces 33a, 33b of the projecting portions 30a, 30b from both the intersecting plane 35a and the intersecting plane 35b on this shared plane. Therefore, to set the projecting heights La, Lb of the projecting portions 30a, 30b to certain values or higher, a sufficient supply amount of the plastically deformed material is needed.

The projecting heights La, Lb of the structural hydroformed joint member 10 satisfy 0.3 D or higher and 0.8 D or lower when both the intersecting plane 35a and the intersecting plane 35b share a plane perpendicular to the main axis 40 of the main tube part 20 only in the portion 36a of the intersecting plane 35a and the portion 36b of the intersecting plane 35b, the area of the portion 36a of the intersecting plane 35a is in the range of 30% or more and 90% or less of the area of the intersecting plane 35a, and the area of the portion 36b of the intersecting plane 35b is in the range of 30% or more and 90% or less of the area of the intersecting plane 35b.

That is, in FIG. 1, in the region illustrated by K, since the intersecting plane 35a and the intersecting plane 35b share a plane perpendicular to the main axis 40 of the main tube part 20, supply of the plastically deformed material is insufficient. However, other than the region indicated by K, since the intersecting plane 35a and the intersecting plane 35b do not share a plane perpendicular to the main axis 40 of the main tube part 20, supply of the plastically deformed material is sufficient, and the insufficient amount of material supply in the region indicated by K can be compensated. As a result, the projecting heights La, Lb of the projecting portions 30a, 30b can be set to 0.3 D or higher and 0.8 D or lower.

By variation of the region indicated by K, the area of the portion in the intersecting plane 35a in which the intersecting plane 35a and the intersecting plane 35b share the plane perpendicular to the main axis 40, that is, the area of the portion 36a of the intersecting plane 35a varies. Regarding the area of the portion 36a of the intersecting plane 35a, it is necessary that the lower limit is 30% and the upper limit is 90% relative to the area of the intersecting plane 35a. When the area of the portion 36a of the intersecting plane 35a is less than 30% relative to the area of the intersecting plane 35a, the projecting height La exceeds 0.8 D. Further, when the area of the portion 36a of the intersecting plane 35a is less than 30% relative to the area of the intersecting plane 35a, sufficient improvement in rigidity of a coupling portion by using the chassis joint 10 cannot be expected. On the other hand, when the area of the portion 36a of the intersecting plane 35a is more than 90% relative to the area of the intersecting plane 35a, material supply in the region indicated by K becomes insufficient. Thus, the projecting height La of the projecting portion 30a becomes low, and the projecting height La does not reach 0.3 D.

The area of the portion 36b of the intersecting plane 35b is similar to the case of the portion 36a of the intersecting plane 35a.

By applying the present invention as described above, the plural projecting portions 30a, 30b branching from a portion of the hydroformed body being an origin can be provided on the hydroformed body. These plural projecting portions 30a, 30b have projecting heights necessary for coupling an opponent part by welding or the like to the hydroformed body, and thus the hydroformed body can be used as a structural hydroformed joint member, and can be made as a structure branching from a portion of the structural hydroformed joint member being an origin.

Further, since the structural hydroformed joint member has a hollow structure, the structural hydroformed joint member can be reduced in weight while achieving both strength and rigidity, and can consequently allow the entire structure formed by using the structural hydroformed joint member to be reduced in weight while achieving both strength and rigidity, thereby exhibiting significant industrial effects.

In this embodiment, the two projecting portions 30a, 30b are disposed diagonally around the main axis 40 of the main tube part 20, but the angle thereof is not limited to be orthogonal. When the two projecting portions 30a, 30b are disposed to be shifted by 180 degrees around the main axis 40, hydroforming is relatively easy. However, by applying the present invention, hydroforming to have the projecting heights La, Lb satisfying 0.3 D or higher and 0.8 D or lower is possible even when the two projecting portions 30a, 30b are disposed closely around the main axis 40, that is, disposed at an angle shifted by 30 degrees or more and less than 180 degrees around the main axis 40.

Note that when the present invention is applied to a structural member for automobile, high mechanical strength and rigidity as a joint member is needed, and thus the two projecting portions 30a, 30b are desired to be disposed at an angle shifted by 45 degrees or more and less than 135 degrees around the main axis 40. When placing importance on sufficient mechanical strength as a structural member for automobile, the above-described projections are needed to be a certain size or larger. Thus, in order for the projecting heights La, Lb to satisfy 0.3 D or higher and 0.8 D or lower, the lower limit value of the aforementioned angle is 45 degrees due to the limitation of hydroforming. On the other hand, when placing importance on rigidity to be given to the entire automobile structure as a structural member for automobile, the upper limit of the aforementioned angle is 135 degrees.

Moreover, when higher mechanical strength and rigidity are needed as a structural member for automobile, the aforementioned angle is desired to be 60 degrees or more and 120 degrees or less. When much higher mechanical strength and rigidity are needed not only in the structural member for automobile, the aforementioned angle is desired to be 80 degrees or more and 100 degrees or less.

Second Embodiment

Figure 8:
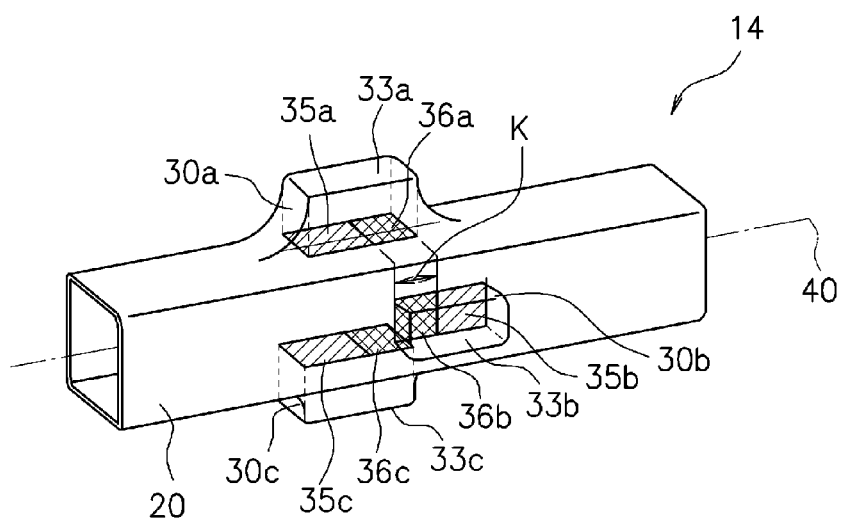
FIG. 8 is a perspective view illustrating a three-branch automobile chassis joint according to a second embodiment.

In the first embodiment, the case where there are two projecting portions is described, but the case where there are three or more projecting portions can be described similarly. FIG. 8 is a perspective view illustrating a three-branch automobile chassis joint which is a structural hydroformed joint member according to a second embodiment applying the present invention. In FIG. 8, numeral 14 illustrates the three-branch automobile chassis joint (hereinafter referred to as a "three-branch chassis joint"). Differences from the first embodiment are mainly described below. Similar components are designated by same numerals, and detailed descriptions thereof are omitted.

As illustrated in FIG. 8, the three-branch chassis joint 14 is obtained by adding another projecting portion 30c to projecting portions 30a, 30b similar to those described in the first embodiment. The three-branch chassis joint 14 has an intersecting plane 35a of a projecting portion 30a, an intersecting plane 35b of a projecting portion 30b, and an intersecting plane 35c of a projecting portion 30c. In this case, it is necessary to share a plane perpendicular to a main axis 40 of a main tube part 20 only in a portion 36a of the intersecting plane 35a, a portion 36b of the intersecting plane 35b, and a portion 36c of the intersecting plane 35c.

When there are three or more projecting portions in this manner, all the intersecting planes share a plane perpendicular to the main axis 40 of the main tube part 20 only in their respective portions. For example, in the case of the three-branch chassis joint 14, all the intersecting planes 35a, 35b, 35c share the plane perpendicular to the main axis 40 only in their respective portions. Therefore, for example, when the intersecting plane 35a and the intersecting plane 35b share a plane perpendicular to the main axis 40 only in their respective portions and the intersecting plane 35b and the intersecting plane 35c share a plane perpendicular to the main axis 40 only in their respective portions, but the intersecting plane 35a and the intersecting plane 35c do not share a plane perpendicular to the main axis 40 only in their respective portions, not all the intersecting planes 35a, 35b, 35c share the plane perpendicular to the main axis 40 only in their respective portions.

Further, regarding the area of the portion 36c of the intersecting plane 35c, the lower limit needs to be 30% and the upper limit be 90% relative to the area of the intersecting plane 35c, similarly to the case of the intersecting planes 35a, 35b.

Regarding each of projecting heights La, Lb, Lc, it is necessary that the lower limit is 0.3 D and the upper limit is 0.8 D. It was found from experiment that when the number of projecting portions is increased, the size of one projecting portion decreases, and thus the projecting height does not depend on the number of projecting portions. Note that the projecting height Lc of the projecting portion 30c is defined similarly to the case of La, Lb described in the first embodiment.

Third Embodiment

Figure 9A:
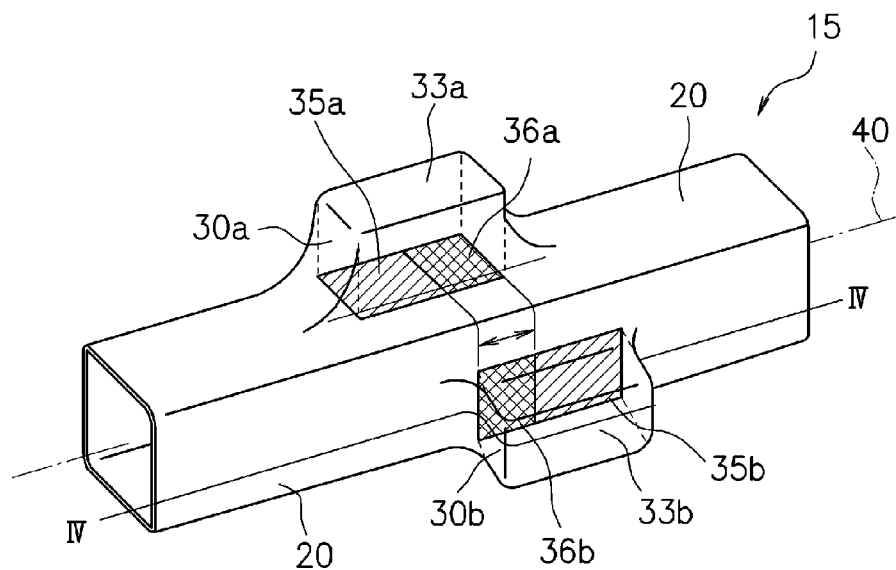
FIG. 9A is a perspective view illustrating an automobile door surrounding joint according to a third embodiment.
Figure 9B:
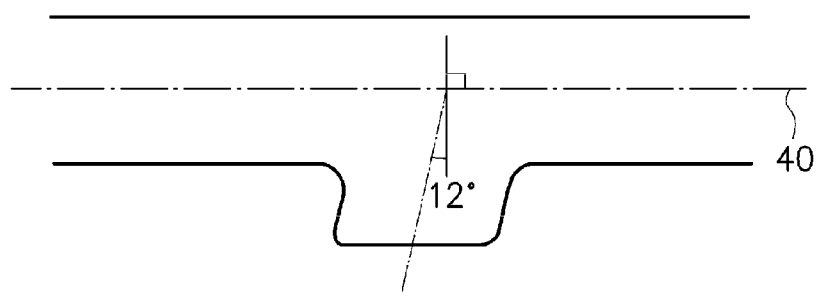
FIG. 9B is a cross-sectional view taken along line IV-IV of FIG. 9A.

Although in the first embodiment the projecting portions 30a, 30b are formed to project in an orthogonal direction to the main axis 40 of the main tube part 20, the projecting portions may also be formed to project obliquely relative to the main axis 40. FIG. 9A is a perspective view illustrating an automobile door surrounding joint which is a structural hydroformed joint member according to a third embodiment applying the present invention. Further, FIG. 9B is a cross-sectional view taken along line IV-IV of FIG. 9A. In FIG. 9A, numeral 15 denotes the automobile door surrounding joint. Differences from the first embodiment are mainly described below. Similar components are designated by same numerals, and detailed descriptions thereof are omitted.

In the automobile door surrounding joint 15, both an intersecting plane 35a of a projecting portion 30a and an intersecting plane 35b of a projecting portion 30b share a plane perpendicular to the main axis 40 only in portions in the region indicated by K. Then, the area of a portion 36a of the intersecting plane 35a is in the range of 30% or more and 90% or less of the intersecting plane 35a and the area of a portion 36b of the intersecting plane 35b is in the range of 30% or more and 90% or less of the intersecting plane 35b, and projecting heights La, Lb are 0.3 D or higher and 0.8 D or lower. That is, when the plane perpendicular to the main axis 40 of a main tube part 20 is shared only in the portion 36a of the intersecting plane 35a of the projecting portion 30a and only in the portion 36b of the intersecting plane 35b of the projecting portion 30b, the projecting heights La, Lb are 0.3 D or higher and 0.8 D or lower.

The automobile door surrounding joint 15 illustrated in FIG. 9A and FIG. 9B is formed so that the projecting portion 30a projects in an orthogonal direction to the main axis 40 of the main tube part 20, and the projecting portion 30b projects obliquely at 12 degrees relative to the orthogonal direction of the main axis 40 of the main tube part 20. The intersecting plane 35b of the projecting portion 30b which projects obliquely relative to the main axis 40 is a projected plane of an end face 33b projected toward the main tube part 20 along its projecting direction (straight direction oblique at 12 degrees relative to the orthogonal direction of the main axis 40). Note that the angle of the projecting portion 30b is not limited to this. Further, the projecting portion 30a may also be disposed to project in an oblique direction with respect to the main axis 40 of the main tube part 20.

Fourth Embodiment

Figure 10:
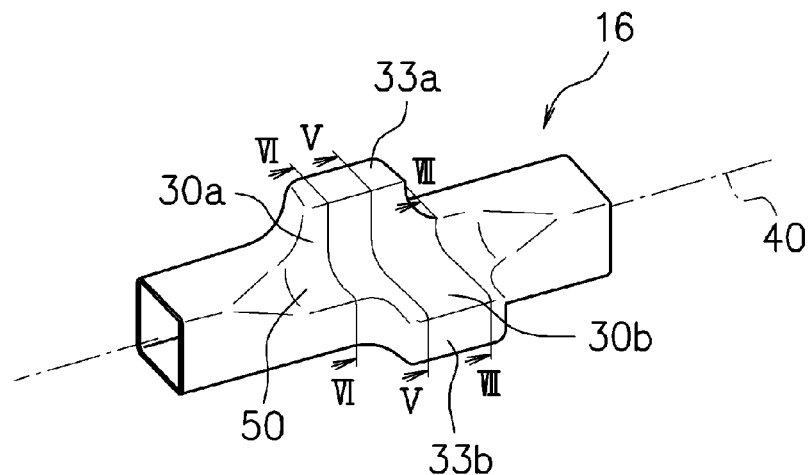
FIG. 10 is a perspective view illustrating an automobile chassis joint according to a fourth embodiment.
Figure 14:
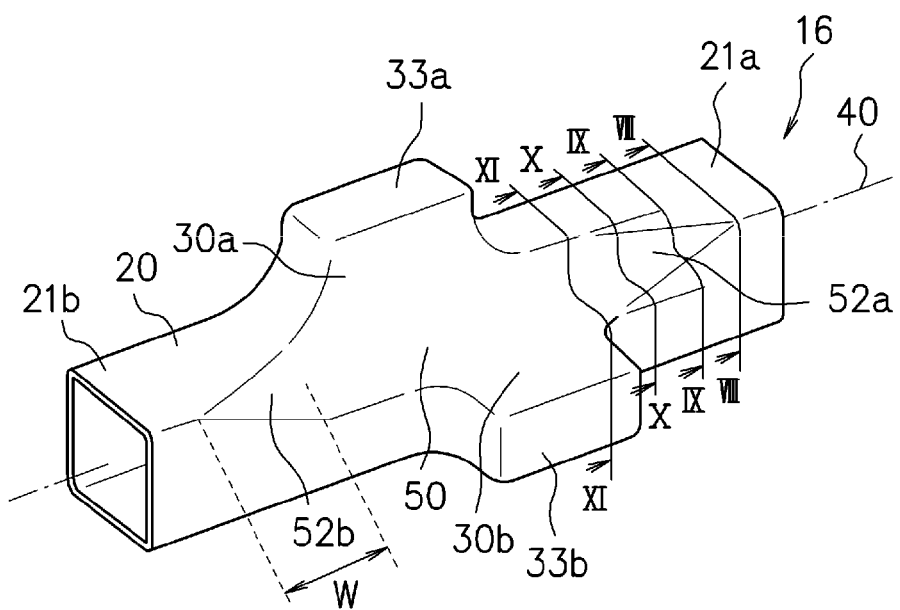
FIG. 14 is a view describing a curved joining face and a gradually varying portion which are provided in an automobile chassis joint according to a fourth embodiment.

In a fourth embodiment, a shape connecting projecting portions will be described. FIG. 10 is a perspective view illustrating an automobile chassis joint which is a structural hydroformed joint member according to the fourth embodiment. In FIG. 10, numeral 16 denotes a chassis joint. Further, FIG. 14 is a view illustrating a curved joining face and gradually varying portions provided on the chassis joint 16 according to the fourth embodiment. Differences from the first embodiment are mainly described below. Similar components are designated by same numerals, and detailed descriptions thereof are omitted.

The automobile chassis joint 16 according to the fourth embodiment connects a projecting portion 30a to a projecting portion 30b sequentially by a smooth curved face, as illustrated in FIG. 10 and FIG. 14. This curved face will be referred to as a curved joining face 50 below. Since the curved joining face 50 sequentially connects the projecting portion 30a and the projecting portion 30b, improvement in rigidity of the entire structure in which the chassis joint 16 is one of components can be expected.

When the projecting portion 30a is connected to the projecting portion 30b sequentially by a smooth curved face, gradually varying portions 52a, 52b may be provided at positions apart from the projecting portions 30a, 30b on the main tube part 20.

In the chassis joint 16 illustrated in FIG. 10, similarly to the chassis joint 10 according to the first embodiment, the area of a portion 36a of an intersecting plane 35a is in the range of 30% or more and 90% or less of the area of the intersecting plane 35a and the area of a portion 36b of an intersecting plane 35b is in the range of 30% or more and 90% or less of the area of the intersecting plane 35b, and both projecting heights La, Lb are 0.3 D or higher and 0.8 D or lower.

Figure 11:
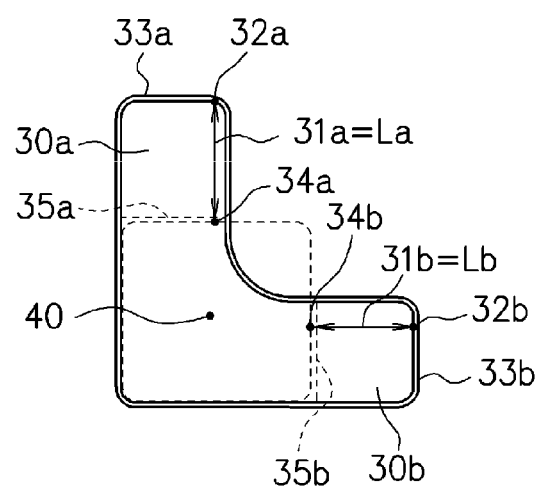
FIG. 11 is a cross-sectional view taken along line V-V of FIG. 10.
Figure 12:
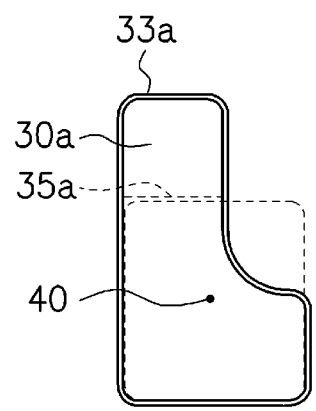
FIG. 12 is a cross-sectional view taken along line VI-VI of FIG. 10.
Figure 13:
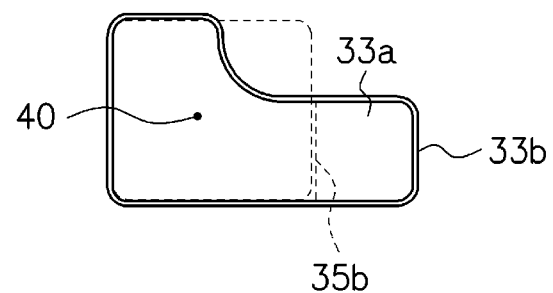
FIG. 13 is a cross-sectional view taken along line VII-VII of FIG. 10.

Further, on the cross section taken along line V-V of FIG. 10, both the intersecting plane 35a and the intersecting plane 35b exist as illustrated in FIG. 11. On the other hand, on the cross section taken along line VI-VI of FIG. 10, only the intersecting plane 35a exists and the intersecting plane 35b does not exist, as illustrated in FIG. 12. Further, on the cross section taken along line VII-VII of FIG. 10, only the intersecting plane 35b exists and the intersecting plane 35a does not exist, as illustrated in FIG. 13.

Next, the curved joining face 50 and the gradually varying portions 52a, 52b will be described. The projecting portion 30a and the projecting portion 30b are connected smoothly and sequentially by the curved joining face 50, and the projecting portion 30a and the projecting portion 30b are joined. When there are three or more projecting portions, adjacent projecting portions around the main axis 40 are connected to each other by the smooth curved face, and the projecting portions are joined one to another.

Figure 15A:
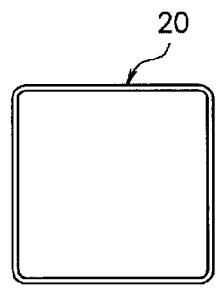
FIG. 15A is a cross-sectional view taken along line VIII-VIII of FIG. 14.
Figure 15B:
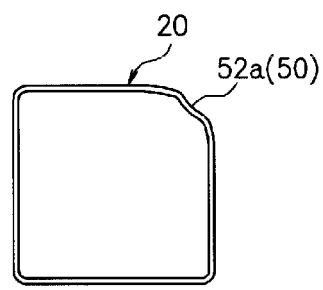
FIG. 15B is a cross-sectional view taken along line IX-IX of FIG. 14.
Figure 15C:
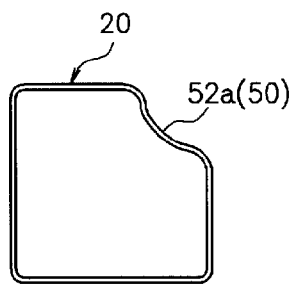
FIG. 15C is a cross-sectional view taken along line X-X of FIG. 14.
Figure 15D:
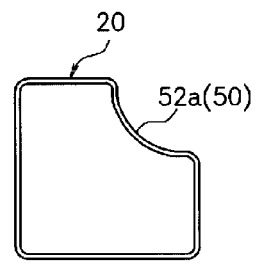
FIG. 15D is a cross-sectional view taken along line XI-XI of FIG. 14.

The curved joining face 50 has the gradually varying portions 52a, 52b on both ends in the main axis 40 direction of the main tube part 20. FIG. 15A to FIG. 15D are views illustrating a cross-sectional shape variation of the main tube part 20 for describing the shape of the gradually varying portion 52a of the chassis joint 16. FIG. 15A is a cross-sectional view taken along line VIII-VIII of FIG. 14. FIG. 15B is a cross-sectional view taken along line IX-IX of FIG. 14. FIG. 15C is a cross-sectional view taken along line X-X of FIG. 14. FIG. 15D is a cross-sectional view taken along line XI-XI of FIG. 14. In the cross section taken along the line VIII-VIII close to one tube end 21a, the curved joining face 50 does not exist. Then, the area of the gradually varying portion 52a increases in the order of the cross section taken along line IX-IX, the cross section taken along line X-X, and the cross section taken along line XI-XI, and the area becomes largest on the cross section taken along line XI-XI. That is, the gradually varying portion 52a reaches its end point at the position of the cross section taken along line XI-XI. Thus, the curved joining face 50 has the gradually varying portion 52a whose area decreases toward the tube end 21a. A tube end 21b opposite to the main tube part 20 also has the similar gradually varying portion 52b.

By joining the projecting portion 30a and the projecting portion 30b by the curved joining face 50, the entire rigidity of the chassis joint 16 can be improved. Then, by further providing the gradually varying portions 52a, 52b, the entire rigidity of the chassis joint 16 can be increased further.

When the size of the gradually varying portion 52b is represented by a length W in a direction parallel to the main axis 40 of the main tube part 20 as illustrated in FIG. 14, both rigidity improvement and hydroformability of the chassis joint 16 can be achieved when W is 0.2 D or longer and 2.0 D or shorter. When W is shorter than 0.2 D, the shape variation of the gradually varying portion 52b is rapid, and thus the hydroformability decreases. On the other hand, when W exceeds 2.0 D, the rigidity improvement effect decreases. D represents an outside diameter of the element tube before hydroforming. The same applies to the gradually varying portion 52a.

Fifth Embodiment

Figure 16:
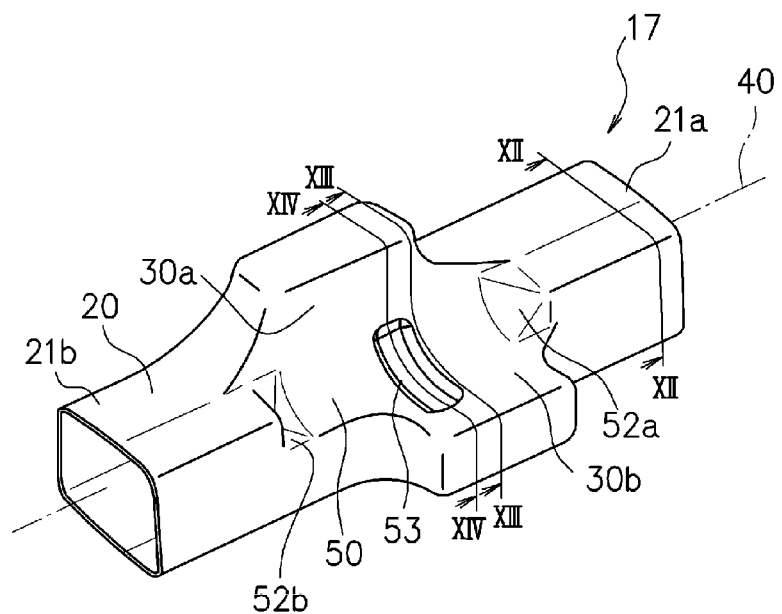
FIG. 16 is a perspective view illustrating an automobile chassis joint according to a fifth embodiment.

A protruding circumferential rib may be provided between adjacent projecting portions 30a, 30b around a main axis 40 of a main tube part 20. FIG. 16 is a perspective view illustrating an automobile chassis joint which is a structural hydroformed joint member according to a fifth embodiment. In FIG. 16, numeral 17 denotes the chassis joint.

In the chassis joint 17 according to the fifth embodiment, a circumferential rib 53 protruding inward of the main tube part 20 is formed on a curved joining face 50 connecting the projecting portion 30a and the projecting portion 30b.

Figure 17A:
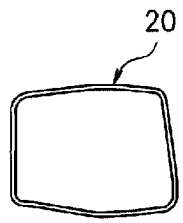
FIG. 17A is a cross-sectional view taken along line XII-XII of FIG. 16.
Figure 17B:
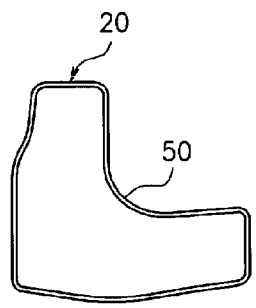
FIG. 17B is a cross-sectional view taken along line XIII-XIII of FIG. 16.
Figure 17C:
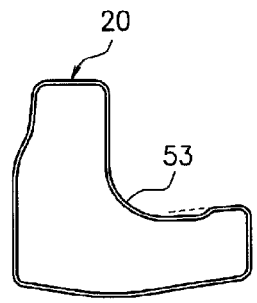
FIG. 17C is a cross-sectional view taken along line XIV-XIV of FIG. 16.

FIG. 17A to FIG. 17C are views illustrating a cross-sectional shape variation of the main tube part 20. FIG. 17A is a cross-sectional view taken along line XII-XII of FIG. 16. FIG. 17B is a cross-sectional view taken along line XIII-XIII of FIG. 16. FIG. 17C is a cross-sectional view taken along line XIV-XIV of FIG. 16. As is clear from the cross section taken along line XIV-XIV illustrated in FIG. 17C, the circumferential rib 53 protruding inward of the main tube part 20 is formed on the curved joining face 50. By providing a protruding rib like the circumferential rib 53 on the curved joining face 50, the rigidity of the entire chassis joint 17 can be improved.

The depth of the circumferential rib 53 is preferred to be in the range of 1.0 t or more and 3.0 t or less. Here, t represents the thickness of an element tube before hydroforming. When the depth of the circumferential rib 53 is less than 1.0 t, rigidity improvement effect cannot be obtained. On the other hand, when it exceeds 3.0 t, hydroformability decreases.

Sixth Embodiment

Figure 18:
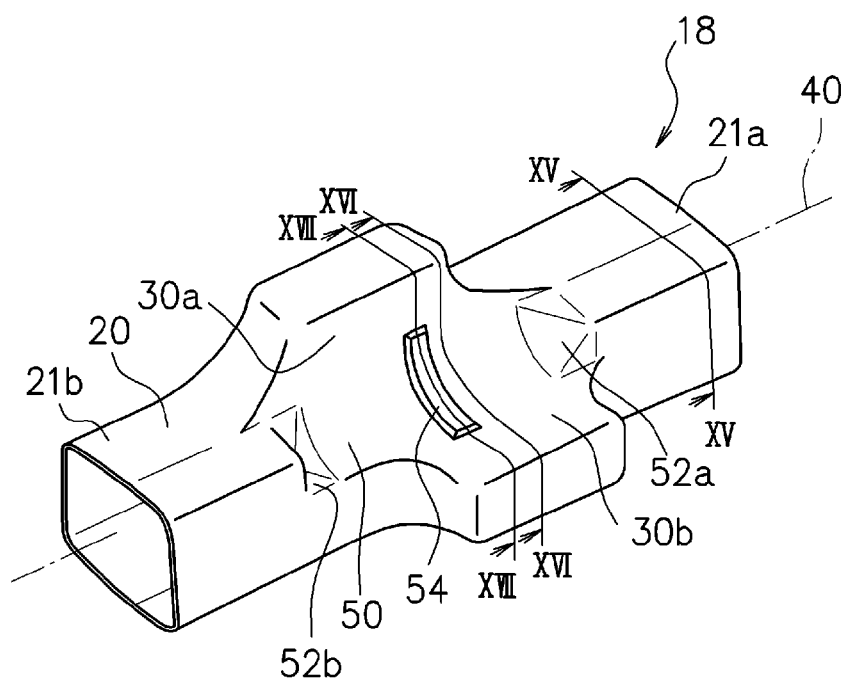
FIG. 18 is a perspective view illustrating an automobile chassis joint according to a sixth embodiment.

The circumferential rib may be projecting outward of the main tube part 20. FIG. 18 is a perspective view illustrating an automobile chassis joint which is a structural hydroformed joint member according to a sixth embodiment. In FIG. 18, numeral 18 denotes the chassis joint.

In the chassis joint 18 according to the sixth embodiment, a circumferential rib 54 protruding outward of the main tube part 20 is formed on a curved joining face 50 connecting a projecting portion 30a and a projecting portion 30b.

Figure 19A:
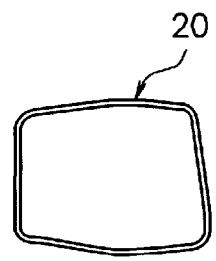
FIG. 19A is a cross-sectional view taken along line XV-XV of FIG. 18.
Figure 19B:
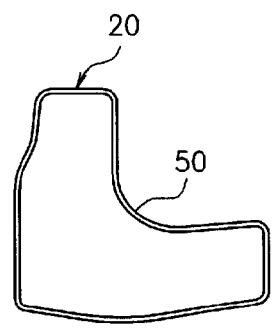
FIG. 19B is a cross-sectional view taken along line XVI-XVI of FIG. 18.
Figure 19C:
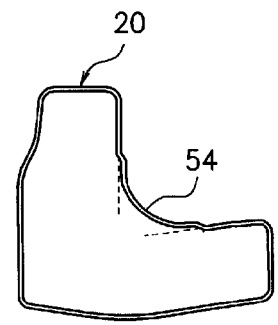
FIG. 19C is a cross-sectional view taken along line XVII-XVII of FIG. 18.

FIG. 19A to FIG. 19C are views illustrating a cross-sectional shape variation of the main tube part 20. FIG. 19A is a cross-sectional view taken along line XV-XV of FIG. 18. FIG. 19B is a cross-sectional view taken along line XVI-XVI of FIG. 18. FIG. 19C is a cross-sectional view taken along line XVII-XVII of FIG. 18. As is clear from the cross section taken along line XVII-XVII illustrated in FIG. 19C, the circumferential rib 54 protruding outward of the main tube part 20 is formed on the curved joining face 50. By providing a protruding rib like the circumferential rib 54 on the curved joining face 50, the rigidity of the entire chassis joint 17 can be improved. The depth of the circumferential rib 54 is the same as the case of the circumferential rib 53.

Figure 20A:
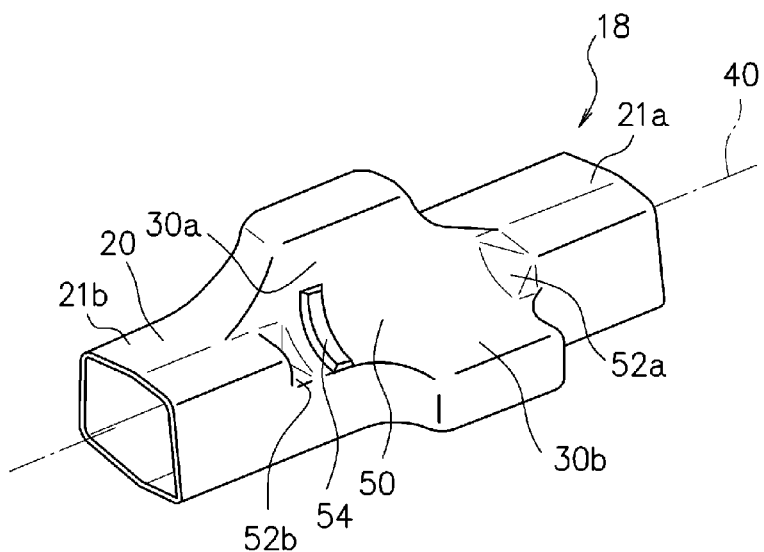
FIG. 20A is a view illustrating an example of providing a circumferential rib on a curved joining face provided in a region where the intersecting plane of a projecting portion and the intersecting plane of another projecting portion do not share a plane perpendicular to the main axis of the main tube part.
Figure 20B:
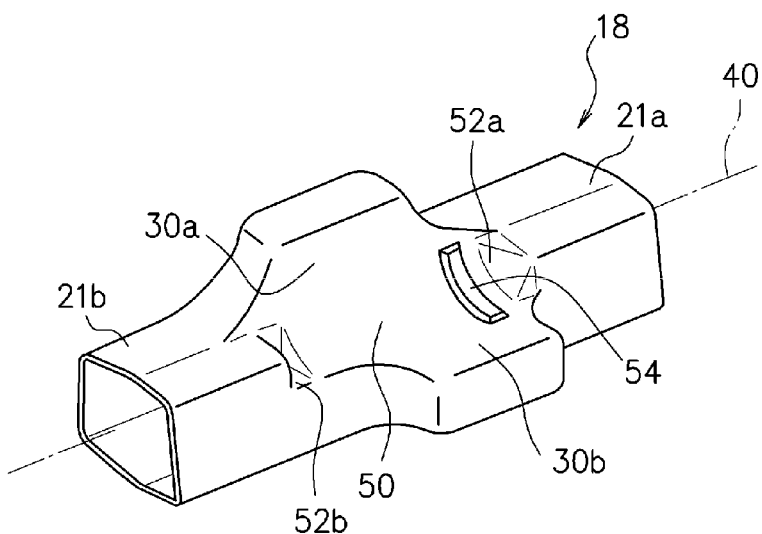
FIG. 20B is a view illustrating an example of providing the circumferential rib on the curved joining face provided in the region where the intersecting plane of the projecting portion and the intersecting plane of the other projecting portion do not share a plane perpendicular to the main axis of the main tube part.

Here, as illustrated in FIG. 18, the circumferential rib 54 projecting outward of the main tube part 20 can be provided on the curved joining face 50 inside the region indicated by K in FIG. 1 in which the intersecting plane 35a of the projecting portion 30a and the intersecting plane 35b of the projecting portion 30b share a plane perpendicular to the main axis 40. Alternatively, as illustrated in FIG. 20A and FIG. 20B, the circumferential rib 54 may be provided on the curved joining face 50 outside the region indicated by K. FIG. 20A and FIG. 20B are views illustrating examples of providing the circumferential rib 54 on the curved joining face 50 outside the region where the intersecting plane 35a of the projecting portion 30a and the intersecting plane 35b of the projecting portion 30b share a plane perpendicular to the main axis 40. FIG. 20A illustrates the case where the circumferential rib 54 is on the tube end 21b side, and FIG. 20B illustrates the case where the circumferential rib 54 is on the tube end 21a side. Note that the position of the circumferential rib 54 projecting outward of the main tube part 20 is described here, but the same applies to the position of the circumferential rib 53 projecting inward of the main tube part 20 described in the fifth embodiment.

Seventh Embodiment

Figure 21:
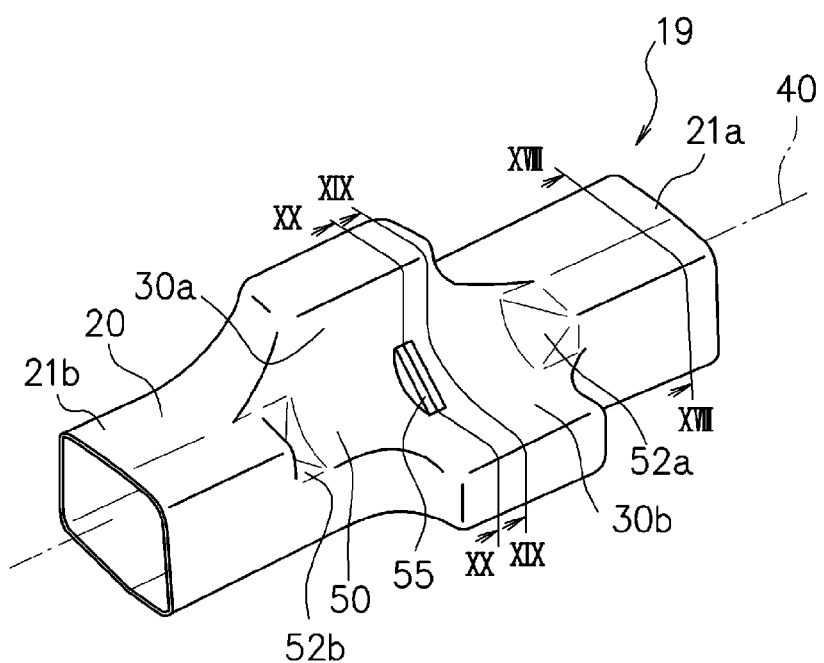
FIG. 21 is a perspective view illustrating an automobile chassis joint according to a seventh embodiment.

Instead of the circumferential rib 54 projecting outward of the main tube part 20, an oblique flat face rib may be provided. FIG. 21 is a perspective view illustrating an automobile chassis joint which is a structural hydroformed joint member according to a seventh embodiment. In FIG. 21, numeral 19 denotes the chassis joint.

Figure 22A:
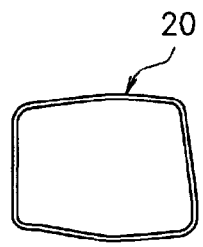
FIG. 22A is a cross-sectional view taken along line XVIII-XVIII of FIG. 21.
Figure 22B:
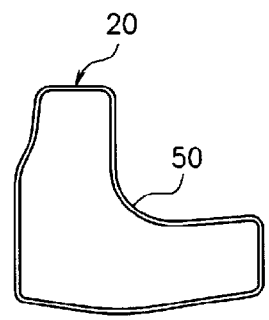
FIG. 22B is a cross-sectional view taken along line XIX-XIX of FIG. 21.
Figure 22C:
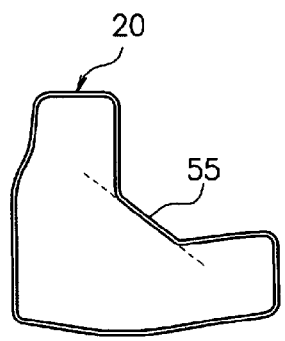
FIG. 22C is a cross-sectional view taken along line XX-XX of FIG. 21.

FIG. 22A to FIG. 22C are views illustrating a cross-sectional shape variation of the main tube part 20. FIG. 22A is a cross-sectional view taken along line XVIII-XVIII of FIG. 21. FIG. 22B is a cross-sectional view taken along line XIX-XIX of FIG. 21. FIG. 22C is a cross-sectional view taken along line XX-XX of FIG. 21. As is clear from the cross section taken along line XX-XX illustrated in FIG. 22C, the curved joining face 50 has an oblique flat face rib 55 which projects outward of the main tube part 20 and the projecting face thereof is an oblique flat face. The oblique flat face rib 55 can obtain effects similar to those of the circumferential ribs 53, 54 having a shape curved along the shape of the curved joining face 50.

Eighth Embodiment

Figure 23:
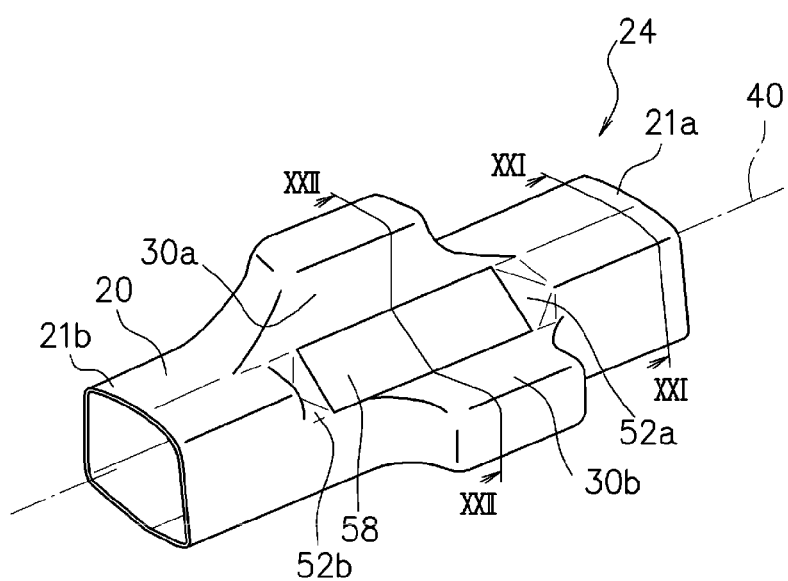
FIG. 23 is a perspective view illustrating an automobile chassis joint according to an eighth embodiment.

As described in the fourth to seventh embodiments, the connection of the projecting portions 30a, 30b is not limited to sequential connection by a curved face, but may be an oblique flat face. FIG. 23 is a perspective view illustrating an automobile chassis joint which is a structural hydroformed joint member according to an eighth embodiment. In FIG. 23, numeral 24 denotes the chassis joint.

Figure 24A:
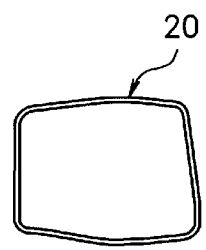
FIG. 24A is a cross-sectional view taken along line XXI-XXI of FIG. 23.
Figure 24B:
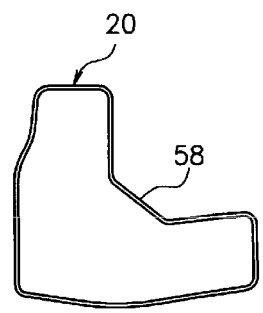
FIG. 24B is a cross-sectional view taken along line XXII-XXII of FIG. 23.

FIG. 24A and FIG. 24B are views illustrating a cross-sectional shape variation of the main tube part 20. FIG. 24A is a cross-sectional view taken along line XXI-XXI of FIG. 23. FIG. 24B is a cross-sectional view taken along line XXII-XXII of FIG. 23. As is clear from the cross section taken along line XXII-XXII illustrated in FIG. 24B, a projecting portion 30a and a projecting portion 30b are connected sequentially by an oblique flat joining face 58, and the projecting portion 30a and the projecting portion 30b are joined. When there are three or more projecting portions, adjacent projecting portions around the main axis 40 are connected to each other by the oblique flat joining face, and the projecting portions are joined one to another. By thus employing the oblique flat joining face 58, the rigidity of the entire chassis joint 24 decreases slightly as compared to the curved joining face 50, but hydroformability can be improved.

Ninth Embodiment

Figure 25:
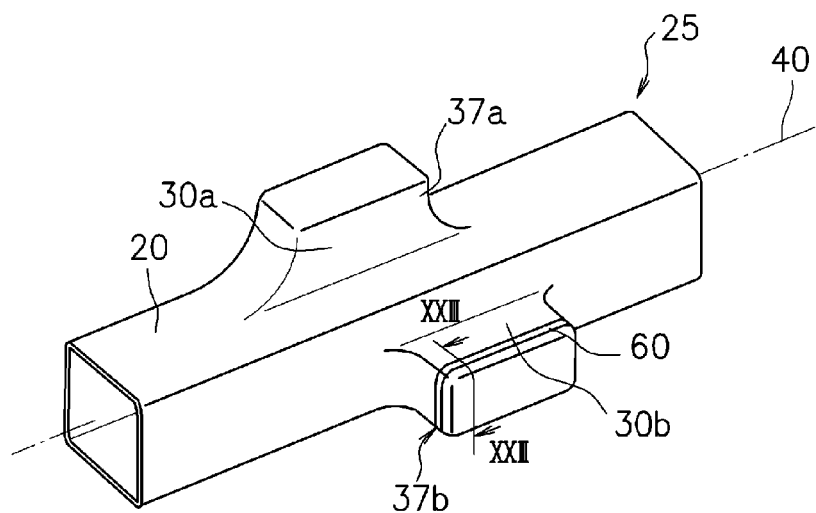
FIG. 25 is a perspective view illustrating an automobile chassis joint according to the ninth embodiment.
Figure 26:
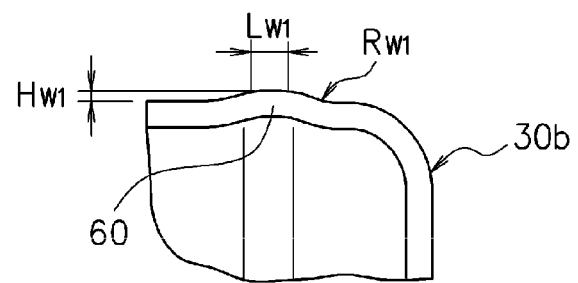
FIG. 26 is a cross-sectional view taken along line XXIII-XXIII of FIG. 25.

In a ninth embodiment, end welding parts of projecting portions on a structural hydroformed joint member applying the present invention will be described. FIG. 25 is a perspective view illustrating an automobile chassis joint which is the structural hydroformed joint member according to the ninth embodiment. In FIG. 25, numeral 25 denotes a chassis joint. Further, FIG. 26 is a cross-sectional view taken along line XXIII-XXIII of FIG. 25. Differences from the first embodiment are mainly described below. Similar components are designated by same numerals, and detailed descriptions thereof are omitted.

The chassis joint 25 is welded at welding end parts 37a, 37b of projecting portions 30a, 30b to an opponent part, thereby forming a desired structure. As illustrated in FIG. 25, an annular welding seat face protruding portion 60 is provided on the welding end part 37b, the welding seat face protruding portion 60 contacts by priority with the opponent part due to its protruding shape. Accordingly, welding at the welding seat face protruding portion 60 ensures welding of the chassis joint 25 and the opponent part, and weldability improves. In particular, when laser welding with a small heat input part is used, it is effective to provide the welding seat face protruding portion 60.

A protruding height $H_{W1}$ illustrated in FIG. 26 is preferred to be 0.3 $t_1$ or higher and 2 $t_1$ or lower. Here, $t_1$ represents the thickness of the chassis joint 25. When $H_{W1}$ is lower than 0.3 $t_1$, the above-described weldability improvement effect cannot be obtained. On the other hand, when $H_{W1}$ exceeds 2 $t_1$, hydroformability decreases. Further, a flat face length $L_{W1}$ is not particularly limited but is preferred to be 5 mm or more and 10 mm or less. When $L_{W1}$ is less than 5 mm, the welding range deviates from the welding seat face protruding portion 60, and welding cannot be performed securely. On the other hand, when $L_{W1}$ exceeds 10 mm, hydroformability decreases. Further, a protrusion shoulder radius $R_{W1}$ is preferred to be 3 $t_1$ or smaller for securing hydroformability.

Figure 27:
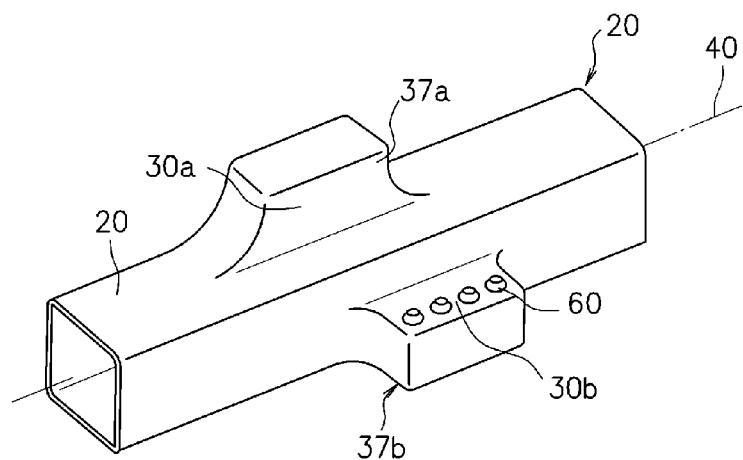
FIG. 27 is a perspective view illustrating an automobile chassis joint according to a modification example of the ninth embodiment.

FIG. 27 illustrates a modification example of the ninth embodiment. The welding seat face protruding portion 60 may have a dotted shape as illustrated in FIG. 27. That is, the projecting portion 30b is preferred to have the welding seat face protruding portion 60 on at least a portion in a circumferential direction in, the welding end part 37b.

Figure 28:
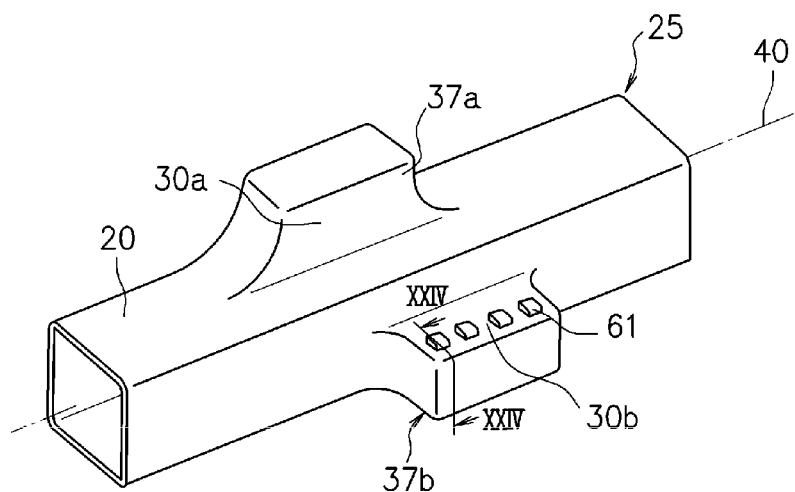
FIG. 28 is a perspective view illustrating an automobile chassis joint according to a modification example of the ninth embodiment.

FIG. 28 illustrates a modification example of the ninth embodiment. Instead of the welding seat face protruding portion 60, a leaf spring welding seat face portion which will be described below may be employed. FIG. 28 is a perspective view of a chassis joint 25 employing a leaf spring welding seat face portion 61 instead of the welding seat face protruding portion 60. Further, FIG. 29 is a cross-sectional view taken along line XXIV-XXIV of FIG. 28.

Figure 29:
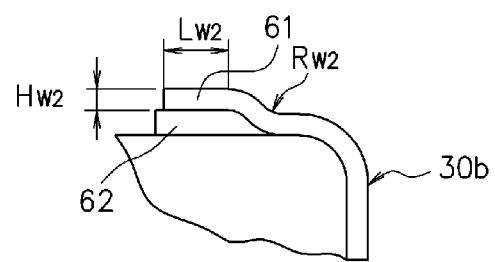
FIG. 29 is a cross-sectional view taken along line XXIV-XXIV of FIG. 28.

The leaf spring welding seat face portion 61 has a shape like a leaf spring by providing a cutout 62, as illustrated in FIG. 29. By employing such a leaf spring welding seat face portion 61, when the chassis joint 25 is welded to an opponent part, it is possible to weld the leaf spring welding seat face portion 61 in a state that it is slightly deformed like a leaf spring, and the contact between the opponent part and the leaf spring welding seat face portion 61 can be improved further. Thus, welding can be performed more securely, and weldability can be improved further.

A seat face height $H_{W2}$ illustrated in FIG. 29 is preferred to be 0.3 $t_1$ or higher and 1.5 $t_1$ or lower. Here, $t_1$ represents the thickness of the chassis joint 25. When $H_{W2}$ is lower than 0.3 $t_1$, the above-described weldability improvement effect cannot be obtained. On the other hand, when $H_{W2}$ exceeds 1.5 $t_2$, it is possible that a crack occurs in a root of the leaf spring welding seat face portion 61 when the leaf spring welding seat face portion 61 is formed by hydroforming. A flat face length $L_{W2}$ and a seat face shoulder radius $R_{W2}$ are similar to the flat face length $L_{W1}$ and the protrusion shoulder radius $R_{W1}$.

Note that the case where the welding seat face protruding portion 60 and the leaf spring welding seat face portion 61 are provided on the welding end part 37b of the projecting portion 30b has been described, but the same applies to the case where they are provided on a welding end part 37a of the projecting portion 30a.

Tenth Embodiment

Figure 30:
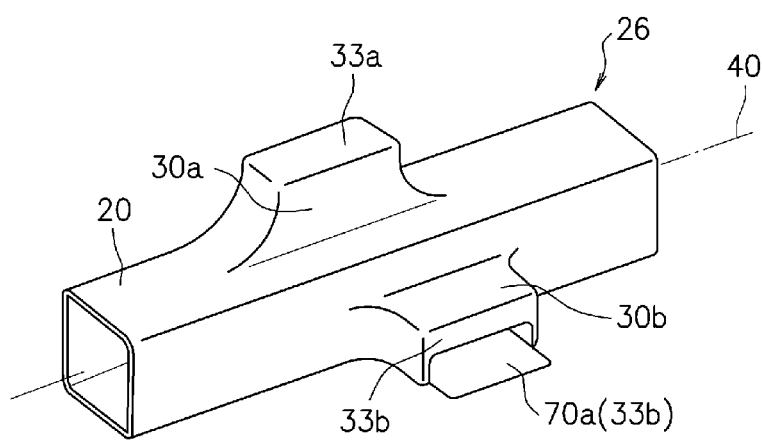
FIG. 30 is a perspective view illustrating an automobile chassis joint according to a tenth embodiment.

In a tenth embodiment also, an end welding part of a projecting portion on a structural hydroformed joint member applying the present invention will be described. In the tenth embodiment, an embodiment will be described in which, for welding to an opponent part is performed at the projecting portion of the structural hydroformed joint member, a part of an end face of the projecting portion is opened to form a welding margin. FIG. 30 is a perspective view illustrating an automobile chassis joint which is the structural hydroformed joint member according to the tenth embodiment. In FIG. 30, numeral 26 indicates the chassis joint. Differences from the first embodiment are mainly described below. Similar components are designated by same numerals, and detailed descriptions thereof are omitted.

In the chassis joint 26, at least a part of the end face 33b of the projecting portion 30b is opened to form a welding margin 70a. The welding margin 70a is overlapped with a welding part of an opponent part and welded thereto. In this manner, welding of the chassis joint 26 to the opponent part is secured. The method for opening at least a part of the end face 33b of the projecting portion 30b may be an ordinary method. For example, it may be shearing, end milling, or the like.

When plural members (parts) are welded to form a structure, if rigidity of a particular member (part) is too high, a breakage may occur easily from anywhere other than the welded part of this particular member (part) when this structure is used. Further, like an impact absorbing member for automobile, it may be desired to cause a breakage intentionally from a particular part of the structure. In these cases, rigidity of the projecting portion 30b can be controlled by opening at least a part of the end face 33b of the projecting portion 30b and changing the area of the opening.

Figure 31:
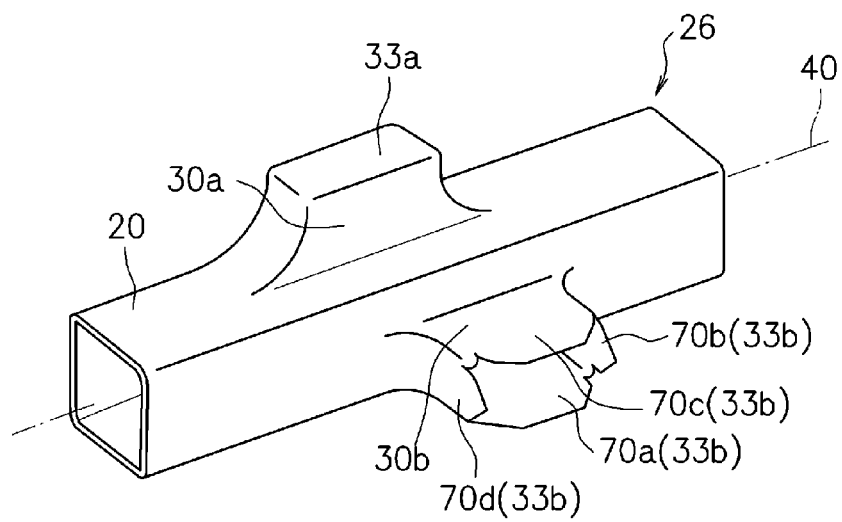
FIG. 31 is a perspective view illustrating an automobile chassis joint according to a modification example of the tenth embodiment.

FIG. 31 illustrates a modification example of the tenth embodiment. The end face 33b of the projecting portion 30b can be opened so that plural welding margins 70a to 70d can be formed, as illustrated in FIG. 31. Note that in FIG. 30 and FIG. 31, the case where the welding margin is provided on the end face 33b of the projecting portion 30b is described, but the same applies to the case where it is provided on the end face 33a of the projecting portion 30a.

EXAMPLE

Next, the present invention will be described further with examples. The condition of the examples are one condition example employed for confirming implementability and effect of the present invention, and the present invention is not limited to this condition example. The present invention can employ various conditions without departing from the spirit of the present invention and as long as the object of the present invention is achieved.

In the chassis joint 10 as illustrated in FIG. 1 and the three-branch chassis joint 14 as illustrated in FIG. 8, the region indicated by K in FIG. 1 and FIG. 8 were varied, and an area ratio R where a plane perpendicular to the main axis 40 of the main tube part 20 is shared in each intersecting plane was varied. Then, how the projecting heights La, Lb, Lc of the projecting portions 30a, 30b, 30c would vary by this was examined.

Note that, describing about the intersecting plane 35a, the area ratio R is the ratio of the area of the intersecting plane 35a which shares the plane perpendicular to the main axis 20 with another intersecting plane, to the area of the intersecting plane 35a. That is, in FIG. 1, it is the ratio of the area of the portion 36a of the intersecting plane 35a to the area of the intersecting plane 35a. The same applies to the intersecting planes 35b, 35c.

There were two diameters, 60.5 mm and 114.3 mm, of the element tube used. Further, the thickness of the element tube was 2.3 mm. The condition of hydroforming was: axial extrusion of 180 mm and internal pressure of 80 MPa when the element tube with a tensile strength of 390 MPa class is formed; axial extrusion of 200 mm and internal pressure of 100 MPa when the element tube with a tensile strength of 540 MPa class is formed; and axial extrusion of 210 mm and internal pressure of 120 MPa when the element tube with a tensile strength of 780 MPa class is formed.

Combinations and results of the respective conditions are illustrated in Table 1.

TABLE 1

| No. | TYPE | ELEMENT TUBE DIAMETER D (mm) | ELEMENT TUBE TENSILE STRENGTH (MPa) | SHAPE | INTERSECTING PLANE AREA RATIO R 35a (%) | 35b (%) | 35c (%) | PROJECTING HEIGHT La (mm) | α | Lb (mm) | α | Lc (mm) | α | FORMATION RESULT |
|---|---|---|---|---|---|---|---|---|---|---|---|---|---|---|
| 1 | PRESENT INVENTION EXAMPLE | 60.5 | 380 | TWO BRANCH | 30 | 32 | — | 44.5 | 0.74 | 38.5 | 0.64 | | | ○ |
| 2 | PRESENT INVENTION EXAMPLE | | | | 50 | 52 | — | 28.0 | 0.46 | 25.5 | 0.42 | | | ○ |
| 3 | PRESENT INVENTION EXAMPLE | | | | 70 | 72 | — | 23.5 | 0.39 | 20.5 | 0.34 | | | ○ |
| 4 | COMPARATIVE EXAMPLE | | | | 90 | 92 | — | 19.5 | 0.32 | 16.5 | 0.27 | | | X |
| 5 | PRESENT INVENTION EXAMPLE | 114.3 | 390 | TWO BRANCH | 30 | 32 | — | 90.8 | 0.79 | 82.0 | 0.72 | | | ○ |
| 6 | PRESENT INVENTION EXAMPLE | | | | 50 | 52 | — | 67.7 | 0.59 | 57.5 | 0.50 | | | ○ |
| 7 | PRESENT INVENTION EXAMPLE | | | | 70 | 73 | — | 55.0 | 0.48 | 46.7 | 0.41 | | | ○ |
| 8 | COMPARATIVE EXAMPLE | | | | 90 | 92 | — | 34.7 | 0.30 | 27.9 | 0.24 | | | X |
| 9 | PRESENT INVENTION EXAMPLE | 114.3 | 540 | TWO BRANCH | 30 | 32 | — | 76.5 | 0.67 | 67.0 | 0.59 | | | ○ |
| 10 | PRESENT INVENTION EXAMPLE | | | | 50 | 52 | — | 51.2 | 0.45 | 44.5 | 0.39 | | | ○ |
| 11 | PRESENT INVENTION EXAMPLE | | | | 70 | 73 | — | 44.3 | 0.39 | 40.7 | 0.36 | | | ○ |
| 12 | COMPARATIVE EXAMPLE | | | | 90 | 92 | — | 30.1 | 0.26 | 22.6 | 0.20 | | | X |
| 13 | PRESENT INVENTION EXAMPLE | 114.3 | 780 | TWO BRANCH | 30 | 32 | — | 67.0 | 0.59 | 57.8 | 0.51 | | | ○ |
| 14 | PRESENT INVENTION EXAMPLE | | | | 50 | 52 | — | 44.3 | 0.39 | 40.0 | 0.35 | | | ○ |
| 15 | PRESENT INVENTION EXAMPLE | | | | 70 | 73 | — | 36.8 | 0.32 | 35.1 | 0.31 | | | ○ |
| 16 | COMPARATIVE EXAMPLE | | | | 90 | 92 | — | 18.5 | 0.16 | 15.0 | 0.13 | | | X |
| 17 | PRESENT INVENTION EXAMPLE | 114.3 | 390 | THREE BRANCH | 30 | 32 | 30 | 66.4 | 0.58 | 40.8 | 0.36 | 62.1 | 0.54 | ○ |
| 18 | PRESENT INVENTION EXAMPLE | | | | 50 | 52 | 50 | 51.5 | 0.45 | 37.4 | 0.33 | 49.6 | 0.43 | ○ |
| 19 | PRESENT INVENTION EXAMPLE | | | | 70 | 73 | 70 | 40.3 | 0.35 | 34.7 | 0.30 | 38.9 | 0.34 | ○ |
| 20 | COMPARATIVE EXAMPLE | | | | 90 | 92 | 90 | 29.9 | 0.26 | 21.0 | 0.18 | 26.7 | 0.23 | X |

As is clear from Table 1, it was confirmed that when both intersecting planes share a plane perpendicular to the main axis 40 of the main tube part 20 only in portions of the intersecting planes, and the areas of the portions of the intersecting planes are 30% or more and 90% or less relative to the respective areas of the intersecting planes, that is, the intersecting plane area ratio R is 30% or more and 90% or less, all the projecting heights are 0.3 D or higher by which the function as a joint can be secured with respect to the outside diameter D of the element tube (see formation result ○).

In this respect, it was confirmed that even when a plane perpendicular to the main axis 40 of the main tube part 20 is shared only in portions of the intersecting planes, if the areas of the portions of the intersecting planes are not 30% or more and 90% or less relative to the respective areas of the intersecting planes, that is, the intersecting plane area ratio R is 30% or more and 90% or less, part or all of the projecting heights do not satisfy 0.3 D or higher by which the function as a joint can be secured (see formation result X).

Further, it was confirmed that effects similar to those illustrated in Table 1 were obtained when the chassis joints 10, 14 are provided with at least one of curved joining face 50, gradually varying portions 52a, 52b, circumferential ribs 53, 54, oblique flat joining face 58, welding seat face protruding portion 60, leaf spring welding seat face portion 61, and welding margins 70a to 70d.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof. For example, an example is presented in the above-described embodiments that a lateral cross section (cross section perpendicular to the main axis 40) of the main tube part 20 has a substantially rectangular shape with roundness. However, the shape of the main tube part 20 is not limited, and the lateral cross section of the main tube part 20 may be circular or polygonal.

Further, by applying the structural member of the present invention to a building joint member, the number of steps of assembly can be reduced significantly as compared to the case where a plate member, rod member or the like is fastened with a bolt and so on to construct a building.

Further, when the structural member of the present invention is applied to a building joint member, the structure having the same strength and rigidity can be reduced in weight, and the load to support the empty weight of the building decreases. Thus, the structure of the entire building can be simplified, and quake resistance can be improved.

Moreover, the structural member of the present invention exhibits the largest effect in a steel material such as a high-tensile steel, but may be applied to a light-weight alloy material such as aluminum alloy.

INDUSTRIAL APPLICABILITY

In the present invention, plural branching projecting portions can be provided on a main tube part, and these projecting portions have a desired projecting height. For example, when it is used as a structural joint member having a necessary projecting height for coupling an opponent part by welding or the like, a structure branching from a portion in the structural joint member being an origin can be obtained. Therefore, the present invention has high industrial utility value.

The invention claimed is:

1. A structural member for coupling by welding to another member, comprising:
    a hollow main tube part and at least two projecting portions formed integrally on an outer peripheral face of the main tube part, wherein the main tube part and the at least two projecting portions are formed by hydroforming an element tube having a tensile strength of 340 MPa or more and 850 MPa or less; and wherein
    the two projecting portions are disposed at an angle of 30 degrees or more and less than 180 degrees around a main axis of the main tube part,
    projecting planes of end faces of the respective projecting portions toward the main tube part share a plane perpendicular to the main axis of the main tube part only in portions of the projecting planes,
    areas of the portions of the projecting planes are 30% or more and 90% or less relative to areas of the respective projecting planes, and a projecting height of each of the two projecting portions is 0.3 D or more and 0.8 D or less, where D is an outside diameter of the element tube before hydroforming, and
    the main tube part includes a curved joining face which sequentially joins the two projecting portions and has a smooth curved face projecting inward of the main tube part or an oblique flat joining face which sequentially joins the two projecting portions and has an oblique flat face.

2. The structural member according to claim 1, wherein the two projecting portions are disposed at an angle of 60 degrees or more and 120 degrees or less around the main axis of the main tube part.

3. The structural member according to claim 1, further comprising another projecting portion integrally formed on an outer peripheral face of the main tube part, wherein the projecting planes of the two projecting portions and a projecting plane of an end face of the another projecting portion toward the main tube part share a plane perpendicular to the main axis of the main tube part only in portions of each of the projecting planes.

4. The structural member according to claim 1, wherein the curved joining face or the oblique flat joining face has a gradually varying portion which becomes smaller in area toward a tube end of the main tube part.

5. The structural member according to claim 4, wherein the length of the gradually varying portion is 0.2 D or longer and 2.0 D or shorter in a direction parallel to the main axis of the main tube part.

6. The structural member according to claim 1, wherein the curved joining face or the oblique flat joining face is provided with a circumferential rib which projects inward of the main tube part.

7. The structural member according to claim 1, wherein the curved joining face or the oblique flat joining face is provided with a circumferential rib which projects outward of the main tube part.

8. The structural member according to claim 1, wherein at least one of the two projecting portions has a welding seat face protruding portion on at least a portion in a circumferential direction.

9. The structural member according to claim 1, wherein at least one of the two projecting portions has at least one leaf spring welding seat face portion in a circumferential direction.

10. The structural member according to claim 1, wherein at least one of the two projecting portions has a welding margin formed by opening at least a portion of an end face of the projecting portions.

* * * * *